US00RE37081E

(19) United States
(12) Reissued Patent
Eriksen

(10) Patent Number: US RE37,081 E
(45) Date of Reissued Patent: Mar. 6, 2001

(54) BACKPACK VACUUM CLEANER

(76) Inventor: Steen M. Eriksen, Houmanns Allé 2, Copenhagen NV (DK), DK-2400

(21) Appl. No.: 09/221,800

(22) PCT Filed: May 27, 1994

(86) PCT No.: PCT/DK94/00208

§ 371 Date: Nov. 26, 1995

§ 102(e) Date: Nov. 28, 1995

(87) PCT Pub. No.: WO94/27485

PCT Pub. Date: Dec. 8, 1994

Related U.S. Patent Documents

Reissue of:
(64) Patent No.: 5,588,177
Issued: Dec. 31, 1996
Appl. No.: 08/553,282
Filed: Nov. 28, 1995

(51) Int. Cl.[7] ..... A47L 5/36
(52) U.S. Cl. ..... 15/327.5; 15/352
(58) Field of Search ..... 15/327.5, 352, 15/339

(56) References Cited

U.S. PATENT DOCUMENTS

| | | | | |
|---|---|---|---|---|
| D. 204,366 | | 4/1966 | Nelson . | |
| 283,060 | | 8/1883 | Bailey et al. . | |
| D. 312,517 | | 11/1990 | Hohrein, II et al. . | |
| D. 315,234 | | 3/1991 | Frisell . | |
| 1,047,164 | * | 12/1912 | Butenschoen | 15/327.5 X |
| 1,099,560 | * | 6/1914 | Matchette | 15/327.1 |
| 1,255,662 | * | 2/1918 | Sullivan | 15/344 X |
| 2,392,205 | | 1/1946 | Wales . | |
| 2,519,936 | | 8/1950 | Sayre . | |
| 3,165,774 | | 1/1965 | Barba . | |
| 3,219,129 | | 11/1965 | Yamada . | |
| 3,308,608 | * | 3/1967 | Brimberg | 15/327.5 X |
| 3,884,808 | | 5/1975 | Scott . | |
| 4,054,132 | | 10/1977 | Deeds . | |
| 4,223,419 | * | 9/1980 | Sato et al. | 15/405 X |
| 4,325,162 | * | 4/1982 | Chambers et al. | 15/327.5 |
| 4,427,140 | | 1/1984 | Dennis, Jr. . | |
| 4,608,716 | | 9/1986 | Brumfield . | |
| 4,658,778 | | 4/1987 | Gamoh et al. . | |
| 4,687,414 | | 8/1987 | Wardy . | |
| 4,696,108 | | 9/1987 | Zerrer et al. . | |
| 4,748,412 | * | 6/1988 | DiGiovanni | 15/327.5 |
| 4,765,907 | | 8/1988 | Scott . | |

(List continued on next page.)

FOREIGN PATENT DOCUMENTS

| | | | | |
|---|---|---|---|---|
| 481 229 | | 4/1948 | (BE) . | |
| 325267 | * | 3/1935 | (IT) | 15/327.5 |

OTHER PUBLICATIONS

Scott Water–Vak with power discharge, Scott Industries, Scott Aviation Corporation, New York, Form No. SAC–SALES–5066A Sep. 1966.

*Primary Examiner*—Chris K. Moore
(74) *Attorney, Agent, or Firm*—Alan Kamrath; Oppenheimer Wolff & Donnelly LLP

(57) ABSTRACT

A backpack vacuum cleaner comprising a housing with a compartment for a filter bag, a connection branch for a suction hose, a hip strap to be applied around the hips of the bearer and a pair of shoulder straps. In order to only limit as little as possible the freedom of movement of the bearer with respect to the upper part of his body and arms when using the vacuum cleaner, and at the same time to provide a vacuum cleaner with a comparatively big filter bag and a subsequent big cleaning capacity, the housing is divided in two, the two parts being connected with a flexible connection allowing a tilting movement between the two parts, the hip strap being fastened to the lower part and the shoulder straps being mutually interconnected with an equalizing device for equalizing differences in tension between the two straps.

45 Claims, 2 Drawing Sheets

U.S. PATENT DOCUMENTS

Figure 1:
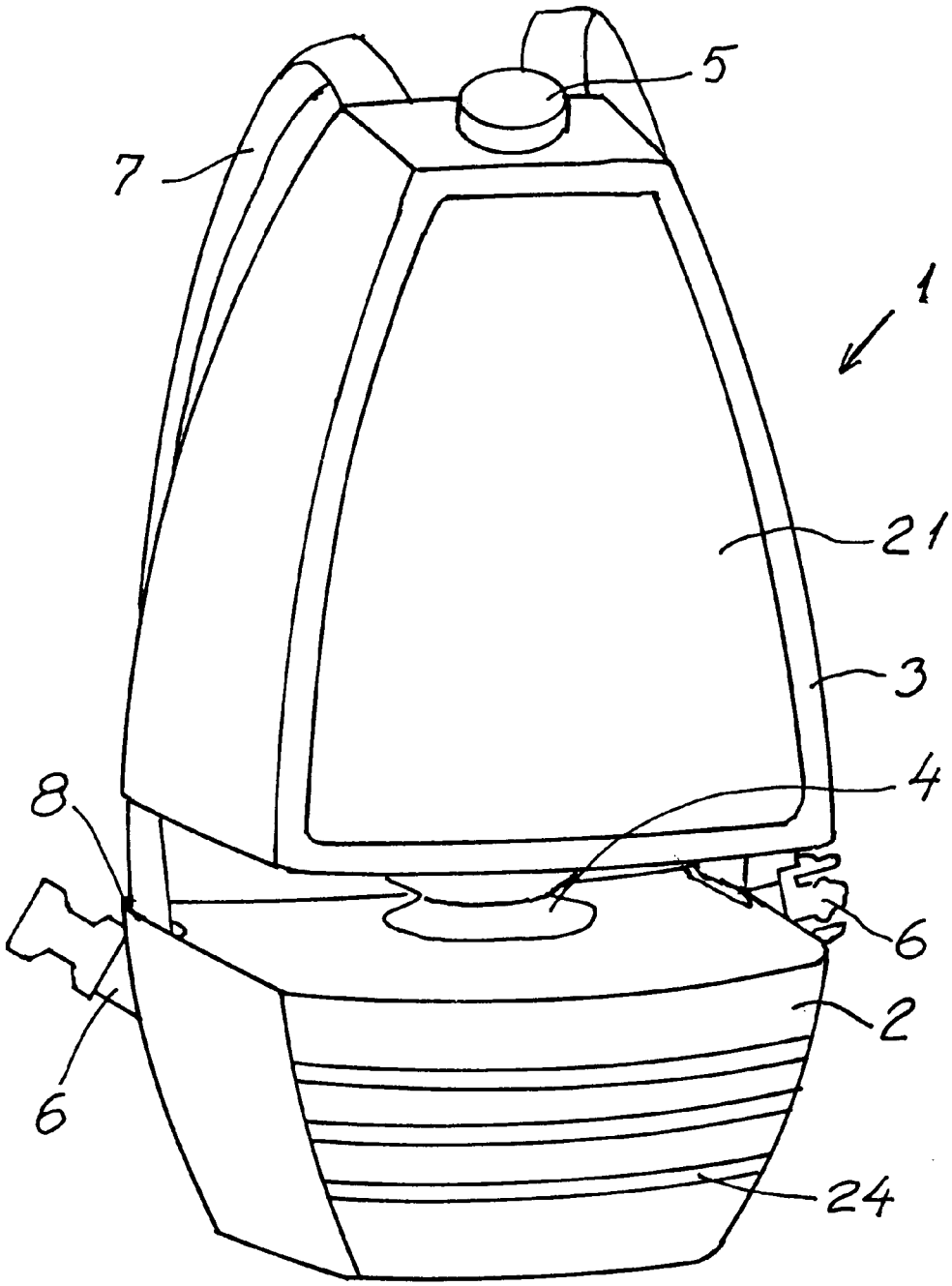

| | | | | |
|---|---|---|---|---|
| 4,779,554 | | 10/1988 | Courtney . | |
| 4,921,143 | | 5/1990 | Billet . | |
| 4,944,065 | * | 7/1990 | Svanberg et al. | 15/327.5 |
| 4,982,884 | | 1/1991 | Wise . | |
| 5,095,259 | | 3/1992 | Bailey et al. . | |
| 5,267,371 | * | 12/1993 | Soler et al. | 15/327.5 |
| 5,813,088 | * | 9/1998 | Wagner et al. | 15/327.5 |

* cited by examiner

BACKPACK VACUUM CLEANER

Matter enclosed in heavy brackets [ ] appears in the original patent but forms no part of this reissue specification; matter printed in italics indicates the additions made by reissue.

The present invention relates to a backpack vacuum cleaner comprising a housing enclosing a motor and an impeller to provide the suction effect and with a compartment for a filter bag, a connection branch for a suction hose, a hip strap to be applied around the hips of the bearer and a pair of shoulder straps.

Portable vacuum cleaners adapted to be carried on the back of the operator are well known, see for example U.S. Pat. No. 1,099,560, in which a vacuum cleaner with two shoulder straps is disclosed. It has also been suggested to fasten a traditional household vacuum cleaner on wheels or runners to a frame belonging to a rucksack. Such frames often in addition to the shoulder straps comprise a hip strap holding the frame in a position close to the back of the operator. Other examples of portable vacuum cleaners to be carried on the back of the operator and in which the weight of the device is transferred mainly to the shoulders of the operator by a pair of straps are disclosed in FR-A-1 451 167 and in U.S. Pat. No. 4,325,162.

These devices comprising a rigid frame to which the vacuum cleaner is connected as a unit have proven to restrict the operator in his freedom of movement, for example to impede his ability to bend forward or twist his body. This is uncomfortable if the operator is to clean for example the seats in a bus, in a cinema or in an aeroplane. To eliminate this drawback portable vacuum cleaners carried solely by means of a hip strap have been proposed, see for example U.S. Pat. No. 1,255,622. A drawback of this known device is that the weight of the motor, which is the heaviest component of the device, is not placed symmetrically with respect to the back of the operator, and the collecting bag is suspended freely from the outlet of the fan house. The depending dust bag will restrict the freedom of movement of the operator in narrow passages, for example between the rows of seats in a bus.

The object of the invention is to provide a portable vacuum cleaner of the type mentioned by way of introduction and which provides an improved comfort to the operator carrying the vacuum cleaner enabling him to use it for extended periods. It is also an object of the invention to provide a high degree of freedom of movement for the operator so that the vacuum cleaner will not substantially restrict the operator from bending forward or to the sides, from twisting his body or lifting one of his arms.

This object is met according to the invention in that the backpack vacuum cleaner is characteristic in that the housing is divided in two, the two parts being connected with a flexible connection allowing a tilting movement between the two parts, in that the hip strap is fastened to the lower part and in that the shoulder straps are mutually interconnected with an equalizing device for equalizing differences in tension between the two straps.

The two-part housing allows the bearer to [band] *bend* forwards and sideways, because the housing can give way in the flexible connection. The major part of the weight of the vacuum cleaner may be carried by the hip strap which is connected with the lower part of the housing, which provides for a comfortable weight distribution enabling the operator to use the vacuum cleaner for extended periods. The upper part of the housing rests, through the flexible connection, on the lower part and in practice only has to be prevented from tilting backwards by the shoulder straps which on account of the equalizing device allow a practically unhindered movement of the bearer's shoulders. The equalizing device thus makes it possible for the bearer to freely lift one shoulder or stretch out an arm and at the same time to twist his body.

In view of the freedom of movement of the bearer it is according to the invention further advantageous that the upper part of the housing holds the filter bag, that the lower part holds the motor, impellers for conveying air through the vacuum cleaner, and means for power supply comprising one or more of the following parts: batteries, battery charger, a coupling for the charging adapter, a mains cable connection, cable spooling, and cable clamp.

The design with filter bag in one part and motor and other heavy components in the other logically leads to a symmetrical construction of the mechanical parts of the vacuum cleaner within the housing. The arrangement of the heaviest parts in the lower part of the housing besides contributes to increasing the bearer's freedom of movement of the upper part of his body.

In order to facilitate as much as possible the adaptation to bearers of different height and stature and to prevent the hip strap from being uncomfortably tight, and hip strap comprises according to the invention at least at one of its connections to the lower part of the housing at least one biasing means adapted to allow the pulling out of a predetermined length of the hip strap under resilient tension.

In a preferred embodiment according to the invention, the biasing means is a self-winding, spring-driven storing coil.

According to the invention, it is preferable that the hip strap at its connections to the lower part of the housing forms an angle (v) with the centre plane of the vacuum cleaner of 60°–75°. In this embodiment, the hip strap will, without being too tight against the hipbone of the bearer and without being suspectible of sliding down, be able to carry the weight of the components normally used in a vacuum cleaner.

Tests have shown that in respect of the shoulders, the biggest freedom of movement for the bearer is attained[,] when the shoulder straps have substantially the same tension and consequently during the movements of the bearer have to be of different [length]*lengths*. According to a preferred embodiment of the invention, the equalizing device of the shoulder straps comprises a connection for tensional transfer between the two shoulder straps at their connection to the lower part of the housing, preferably in *the* form of a duct extending through the housing, through which duct a band connecting or uniting the two shoulder straps is displaceable. This equalizing device substantially equalizes the difference in tension between the shoulder straps by changing the relation between the length of those parts of the straps which are positioned on the front of the bearer, whereby the straps only to a limited degree have to rub against the clothing of the bearer. This form of equalizing is in practice very comfortable.

To facilitate the adaptation of the vacuum cleaner to bearers of different size and also to increase the freedom of movement of the bearer, the shoulder straps comprise according to the invention at least one biasing means adapted to allow the pulling out of a predetermined length of the shoulder straps under resilient tension.

To prevent the shoulder straps from carrying the major part of the weight of the vacuum cleaner, when the bearer stretches upwards, the sum of the resilient pressure on the two shoulder straps is less than the weight of the vacuum cleaner. As the pressure on the two shoulder straps influences the vacuum cleaner at four points, this causes a comparatively slight tightening of the shoulder straps which will therefore not impede the freedom of movement of the bearer.

In connection therewith, a preferred embodiment according to the invention is characteristic in that the biasing means for the shoulder straps comprise self-winding, spring-driven storing coils mounted on a common shaft. By this embodiment, *it* is ensured that at any time the same length of the shoulder straps will be pulled out or wound up and that the upper part of the housing therefore only to a slight extent will be susceptible of displacing itself in relation to the middle of the bearer's back, when he bends to the side.

According to a particularly advantageous embodiment of the invention, the flexible connection of the housing comprises a torsionally rigid tubular bushing of an elastomeric material and with an interior clear, through which the compartment for the filter bag is connected with the inlet to the impellers of the motor, the motor shaft being preferably mounted coaxially with the axis of the bushing. This embodiment ensures both sufficient resiliency of the flexible connection and an air flow between the two parts of the housing.

According to the invention, the two parts of the housing have areas adapted to rest against the back of the bearer, said areas being places in such a relationship to one another that they form an angle of 5°–20°. In this embodiment, the housing will substantially adapt to the back of the bearer and consequently, with a given volume extend as little as possible to the rear relative to the bearer.

It is advantageous that the areas of the housing touching the back of the bearer are provided with substantially hemispherical knobs. This embodiment makes a certain ventilation possible between the housing and the garments of the bearer, which is agreeable during the comparatively hard physical job of vacuum cleaning under normally cramped conditions.

Figure 3:
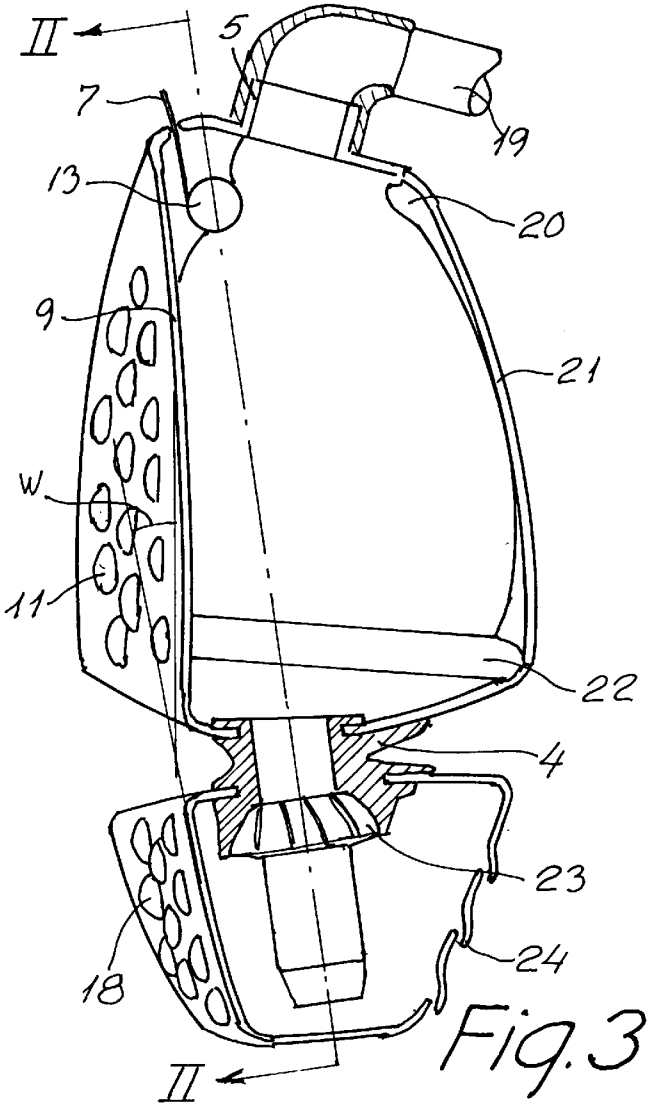
Figure 2:
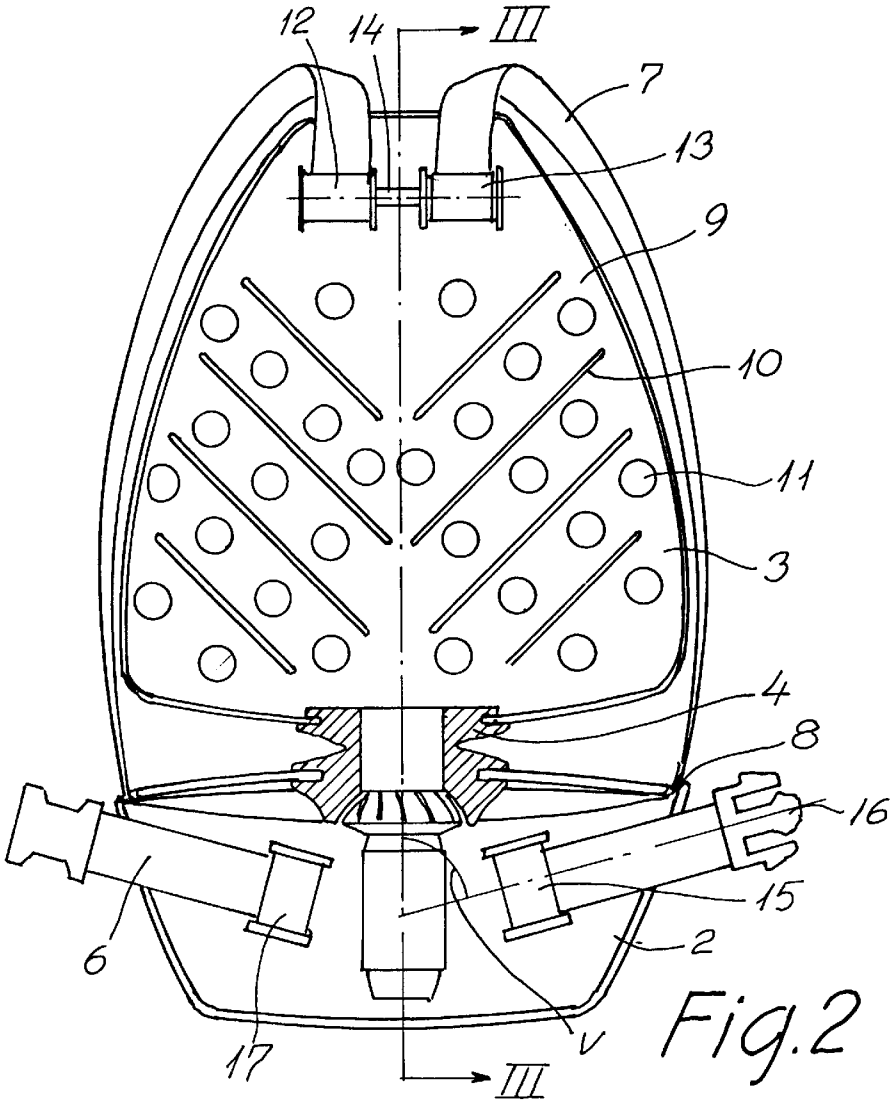

The invention will be described in detail in the following with reference to the drawing, in which FIG. 1 shows a portable vacuum cleaner according to the invention seen from behind in perspective, FIG. 2 shows the vacuum cleaner according to FIG. 1 in a vertical sectional view along the II—II in FIG. 3, and FIG. 3 shows a sectional view along the line III—III in FIG. 2.

The vacuum cleaner 1 shown in FIG. 1 is adapted to be worn by the bearer as a kind of rucksack. The object is to give the bearer, when using the vacuum cleaner, the biggest possible freedom of movement and to make him able, during the vacuum cleaning, to bend forwards and sideways, and to make it possible for the bearer to substantially unimpededly lift one or both arms upwards. This object is according to the invention met in that the housing of the vacuum cleaner is in two parts and comprises a lower part 2 containing heavier mechanical parts, such as *a* motor [end] *and* means for supplying the motor with power as well as an upper part 3 adapted to contain a filter bag. The two parts are connected by means of a flexible connection 4 adapted to allow a certain angular movement between the two parts of the housing. Moreover, the flexible connection forms the tubular connection which makes it possible for the impellers connected with the motor to suck in air through the filter bag which is placed in the upper part of the housing. On top of the upper part 3 of the housing, a bajonet coupling 5 is provided, with which a traditional hose can be connected. The major part of the weight of the vacuum cleaner is carried by a hip strap, of which one half 6 is visible in FIG. 1. The upper part of the housing is supported and kept against the back of the bearer by means of shoulder straps 7 which extend from the upper part of the upper housing 3 and which are passed into an equalizing device in the upper part of the lower housing 2 at a slot 8. The equalizing device is in practice a transverse duct connecting the slots in the opposite sides of the lower part of the housing, and in which the two shoulder straps, which are just sections of a long strap, are united. The embodiment according to the invention is suitable for a symmetrical positioning of the various parts in the interior of the housing, which consequently entails that the point of gravity of the vacuum cleaner will be in the centre plane of the housing. Out of consideration for the comfort of the bearer, the vacuum cleaner should be designed as a light-weight construction, and the motor should be as light and effective as possible. It is desirable that the total weight of the vacuum cleaner is less than 4 kg.

To further increase the comfort during use of the vacuum cleaner and to make the adaptation to users of different height and stature as simple as possible, the straps are provided with a flexible biasing means which partly ensures that the straps are not resting with more pressure than necessary against the body of the bearer, partly makes it possible to change the length during use of the vacuum cleaner, and partly provides an immediate adaptation to users of varying size. FIGS. 2 and 3 show sections through an embodiment of the vacuum cleaner according to the invention and shows how to design the means for attaining the flexible tensioning of the straps. In FIGS. 2 and 3, the same references are used as in FIG. 1 for the parts common to the figures. In FIG. 2 the interior side of the back wall 9 of the upper part of the housing 3 facing the back of the user is shown. This [side] *back* wall is provided with protruding ribs 10 letting air sucked through the filter bag placed in the upper housing *to* pass down [against] *toward* the flexible, tubular connection 4 between the two parts of the housing 2,3. Moreover, the inner surface of some hemispherical projections 11 is seen, said projections providing air circulation between the back of the bearer and the [side] *back* wall 9. The *ends of each* shoulder straps 7 are [on top of the upper part] connected with [each] their storing coil 12,13 which are mounted on a common shaft 14 *on top of the upper part 3*. The storing coils are provided with a biasing means which tries to wind up the shoulder straps 7. The biasing means is adapted in such a way that the shoulder straps only carry a smaller part of the total weight of the vacuum cleaner, but is sufficiently forceful to prevent the upper part from tilting away from the back of the bearer. The arrangement of spring-biased storing coils is a preferred embodiment, but other embodiments will be usable, such as a resilient tape or the like extending along the [side] *back* wall 9. It is preferable that the two shoulder straps 7 always will be pulled out to the same extend, like in the case of wound up straps. The two shoulder straps 7 are provided with an equalizing device placed at the connection of the straps with the lower part 2 of the housing. The two straps are connected to each other through a duct along the backwall 15 of the lower part, whereby differences in tension in the straps are equalized.

The major part of the weight of the vacuum cleaner is carried by a hip strap 6. The hip strap consists of two halves, which are provided with each their half part of a buckle 16. In the same way as the shoulder straps 7, the hip strap is connected with the housing by means of storing coils 17, which partly wind up the strap, when the vacuum cleaner is not in use, partly allows an adaptation of the strap length to bearers of varying stature. Furthermore, the storing coils ensure that the strap also during the bearer's movements is kept sufficiently tight, in order to prevent the vacuum cleaner from sliding down. Part of the weight of the vacuum cleaner is transferred to the loin of the bearer through a friction cover 18 with substantially hemispherical knobs on the side of the backwall 15 facing the bearer. The self-winding coils 17 may be replaced by an elastic strap material.

The hip strap rests most conveniently against the hips of the bearer if the half parts of the straps at their connection with the lower part of the housing form an angle v with the centre plane of the vacuum cleaner of 60°–75°. The hip strap is a webbing of the kind used for safety belts in cars.

FIG. 3 is a sectional view through the vacuum cleaner in its centre plane. Air mixed with dust is sucked into the upper part of the housing through a hole 19 which is connected by means of [a] *the* bajonet coupling [to a neck] 5 on top of the upper part 3 of the housing. In the upper part of the housing a conventional filter bag may be provided. The filter bag, which may be provided with a cardboard disc around the inlet opening, is secured against the opening of the bajonet coupling by means of a nose 20 placed on a door 21 on the front side of the upper part 3. Moreover, a fine filter 22 may be provided in the upper part, through which the air is filtered before it passes through the flexible connection 4 down into the lower part 2 of the vacuum cleaner. The lower part contains the motor of the vacuum cleaner which is placed in extension of the clear of the flexible connection 4 with a view to creating good flow conditions for the air at the inlet to an impeller 23 placed on the shaft of the motor, said impeller providing the suction effect. The motor is with a view to reducing the total weight of the vacuum cleaner preferably of the compact type with a high number of revolutions. The lower part of the housing has a front wall with a kind of grille *24*, through which air may be discharged.

The upper and the lower part of the housing is placed with such a mutual angle that the sides facing the back of the bearer form an angle [v] *w* of 5°–20°, preferably around [14"]*14°*.The object of the parts forming a mutual angle is in particular that the area [18] of the the lower part 2 is to rest against the loin of the bearer and thereby reduce the need to tighten the hip strap, a substantial part of the weight of the vacuum cleaner being transferred via the friction coating.

When designing the housing, it is, in order that the vacuum cleaner hinders as little as possible the freedom of movement of the bearer during the vacuum cleaner, preferable that the housing does not project more backwards relative to the back of the bearer than 11–12 cm, that the lower housing to some degree tapers downwards, for which reason it will not project substantially more backwards when the bearer bends forwards than when he is standing straight, and that the upper housing is narrow and slim at the shoulder blades of the bearer. The upper part of the housing should not be so tall that it reaches the shoulder level of the bearer.

The compact motor only takes up a smaller part of the lower part 2 of the housing. Part of the remaining volume is according to a preferred embodiment of the vacuum cleaner used for rechargeable batteries which deliver the required electric power for operating the motor. According to the preferred embodiment, the package of batteries may further be fastened to the front and under side of the lower part, said front and under side thereby becoming a replaceable unit which can be replaced by another similar unit, if the vacuum cleaner job requires more energy than can be contained in a single battery package. The lower part of the housing is preferably designed in such a way that the vacuum cleaner, when not in use, is placed in an adapter containing transformer and power control for use when [charching] *charging* the batteries contained in the lower part of the housing.

However, the invention is not limited to a battery-driven vacuum cleaner even though the concept of a portable vacuum cleaner is most preferable in connection with a cord free embodiment. The excess space in the lower part of the housing may in an electric mains operated version be used for the holding of a cord loop which moderates the extra pull in the cord if it gets stuck when the bearer moves during the cleaning. A cable drum may be provided in the housing, said drum winding by means of a spring a major or smaller part of the length of the cord at disposal.

I claim:

1. A backpack vacuum cleaner comprising a housing enclosing a motor and an impeller to provide the suction effect and with a compartment for a filter bag, a connection branch for a suction hose, a hip strap to be applied around the hips of the bearer and a pair of shoulder straps, wherein the housing is divided in upper and lower parts connected with a flexible connection allowing a tilting movement between said upper and lower parts, said hip strap being fastened to the lower housing part and said shoulder straps extending from said lower housing part to said upper housing part and being mutually interconnected by means of an equalizing device for equalizing differences in tension between the straps in the pair of shoulder straps.

2. A vacuum cleaner according to claim 1, wherein the upper part of the housing holds the filter bag, and the lower part holds the motor, impellers for conveyance of air through the vacuum cleaner, and means for power supply comprising one or more of the following parts: batteries, battery charger, a coupling for the charging adapter, a main cable connection and cable clamp.

3. A vacuum cleaner according to claim 2, wherein the hip strap at its connections to the lower part of the housing forms an angle (v) with the center plane of the vacuum cleaner of 60°–75°.

4. A vacuum cleaner according to claim 1, wherein the hip strap at least at one of its connections to the lower part of the housing comprises at least one biasing means adapted to allow the pulling out of a predetermined length of the hip strap under resilient tension.

5. A vacuum cleaner according to claim 4, wherein the biasing means is a self-winding, spring-driven storing coil.

6. A vacuum cleaner according to claim 1, wherein the equalizing device of the shoulder strap comprises a connection for tensional transfer between the two shoulder straps at their connection to the lower part of the housing, preferably in form of a duct extending through the housing, through which duct a band connecting or uniting the two shoulder straps is displaceable.

7. A vacuum cleaner according to claim 1, wherein the shoulder straps comprise at least one biasing means adapted to allow the pulling out of a predetermined length of the shoulder straps under resilient pressure.

8. A vacuum cleaner according to claim 7, wherein the sum of the resilient tensional forces on the two shoulder straps is less than the weight of the vacuum cleaner.

9. A vacuum cleaner according to claim 7, wherein the biasing means for the shoulder straps comprise a pair of self-winding, spring-driven storing coils mounted on a common shaft.

10. A vacuum cleaner according to claim 1, wherein the flexible connection of the housing comprises a torsionally rigid tubular bushing of an elastomeric material and with an interior clear, through which the compartment for the filter bag is connected with the inlet to the impellers of the motor, the motor shaft being preferably mounted coaxially with the axis of the bushing.

11. A vacuum cleaner according to claim 1, wherein the two parts of the housing are provided with areas adapted to rest against the back of the bearer, said areas being placed in such a relationship to one another that they form an angle (w) of 5°–20°.

12. A vacuum cleaner according to claim 1, wherein the areas of the housing in contact with the back of the bearer are provided with substantially hemispherical knobs.

*13. A backpack vacuum cleaner comprising, in combination: a lower housing part enclosing a motor and an impeller connected to the motor; an upper housing part divided from the lower housing part and enclosing a filter bag and including a coupling for a suction hose; a hip strap fastened to the lower housing part and to be applied around the hips of the bearer, with the upper housing part resting on the lower housing part allowing tilting movement between the upper and lower housing parts, so that the major part of the weight of the vacuum cleaner is carried by the hip strap, with the upper housing part being prevented from tilting away from the back of the bearer, with the impeller connected to the motor sucking in air through the filter bag of the upper housing part.*

*14. A vacuum cleaner according to claim 13, wherein the upper housing part rests on the lower housing part through a flexible connection allowing angular movement between the upper and lower housing parts.*

*15. A vacuum cleaner according to claim 14, wherein the flexible connection comprises a torsionally rigid bushing of an elastomeric material.*

*16. A vacuum cleaner according to claim 15, wherein the torsionally rigid bushing is tubular with an interior clear, through which the air sucked by the impeller passes between the upper and lower housing parts.*

*17. A vacuum cleaner according to claim 13, wherein the upper housing part is prevented from tilting away by first and second shoulder straps extending from at least the upper housing part.*

*18. A vacuum cleaner according to claim 17, further comprising, in combination: means for providing flexible tensioning of the first and second shoulder straps.*

*19. A vacuum cleaner according to claim 18, wherein the flexible tensioning means comprises first and second storing coils provided with means for biasing the shoulder straps and which tries to wind up the shoulder straps.*

*20. A vacuum cleaner according to claim 19, wherein the first and second storing coils are mounted on a common shaft.*

*21. A vacuum cleaner according to claim 18, wherein the first and second shoulder straps extend from the lower housing part and are provided with an equalizing device placed at the connection of the straps with the lower housing part.*

*22. A vacuum cleaner according to claim 21, wherein the equalizing device comprises a duct extending through the lower housing part, through which duct a band connecting or uniting the two shoulder straps is displaceable.*

*23. A vacuum cleaner according to claim 13, wherein the hip strap at its connections to the lower housing part forms an angle (v) with the center plane of the vacuum cleaner of 60°–75°.*

*24. A vacuum cleaner according to claim 13, wherein the upper and lower housing parts are provided with areas adapted to rest against the back of the bearer, said areas being placed in such a relationship to one another that they form an angle (w) of 5°–20°.*

*25. A vacuum cleaner according to claim 13, wherein the areas of the upper and lower housing parts in contact with the back of the bearer are provided with substantially hemispherical knobs.*

*26. A backpack vacuum cleaner comprising, in combination: a housing enclosing a motor and an impeller to provide the suction effect and with a compartment for a filter bag; a connection branch for a suction hose; a hip strap to be applied around the hips of the bearer; and a pair of shoulder straps, wherein the housing is divided in upper and lower parts connected with a flexible connection allowing a tilting movement between said upper and lower parts, said hip strap being fastened to the lower housing part and said shoulder straps extending from at least said upper housing part.*

*27. A vacuum cleaner according to claim 26, wherein the hip strap at its connections to the lower part of the housing forms an angle (v) with the center plane of the vacuum cleaner of 60°–75°.*

*28. A vacuum cleaner according to claim 26, wherein the hip strap at least at one of its connections to the lower part of the housing comprises at least one biasing means adapted to allow the pulling out of a predetermined length of the hip strap under resilient tension.*

*29. A vacuum cleaner according to claim 26, further comprising, in combination: biasing means adapted to allow the pulling out of predetermined lengths of the shoulder straps under resilient pressure.*

*30. A vacuum cleaner according to claim 29, wherein the sum of the resilient tensional forces on the two shoulder straps is less than the weight of the vacuum cleaner.*

*31. A vacuum cleaner according to claim 26, wherein the flexible connection of the housing comprises a torsionally rigid tubular bushing of an elastomeric material and with an interior clear, through which the compartment for the filter bag is connected with the inlet to the impeller of the motor, the motor shaft being mounted coaxially with the axis of the bushing.*

*32. A vacuum cleaner according to claim 26, wherein the two parts of the housing are provided with areas adapted to rest against the back of the bearer, said areas being placed in such a relationship to one another that they form an angle (w) of 5°–20°.*

*33. A vacuum cleaner according to claim 26, wherein the areas of the housing in contact with the back of the bearer are provided with substantially hemispherical knobs.*

*34. A vacuum cleaner according to claim 26, wherein said shoulder straps are mutually interconnected by means of an equalizing device for equalizing differences in tension between the straps in the pair of shoulder straps.*

*35. A vacuum cleaner according to claim 34, wherein the equalizing device of the shoulder strap comprises a connection for tensional transfer between the two shoulder straps in a form of a duct extending through the housing, through which duct a band connecting or uniting the two shoulder straps is displaceable.*

*36. A backpack vacuum cleaner comprising, in combination: a housing enclosing a motor and an impeller to provide the suction effect and with a compartment for a filter bag; a connection branch for a suction hose; a hip strap to be applied around the hips of the bearer; and a pair of shoulder straps, wherein the hip strap is connected to the housing and includes at least one biasing means adapted to allow the pulling out of a predetermined length of the hip strap under resilient tension, and wherein the shoulder straps are connected to the housing and include at least one biasing means adapted to allow the pulling out of a predetermined length of the shoulder straps under resilient pressure.*

*37. A vacuum cleaner according to claim 36, wherein the housing is divided in upper and lower parts, said hip strap being fastened to the lower housing part and said shoulder straps extending from at least said upper housing part.*

*38. A vacuum cleaner according to claim 37, wherein the upper and lower parts are connected with a flexible connection allowing a tilting movement between said upper and lower parts.*

*39. A vacuum cleaner according to claim 38, wherein the hip strap at its connections to the lower part of the housing forms an angle (v) with the center plane of the vacuum cleaner of 60°–75°.*

*40. A vacuum cleaner according to claim 36, wherein said shoulder straps are mutually interconnected by means of an equalizing device for equalizing differences in tension between the straps in the pair of shoulder straps.*

*41. A vacuum cleaner according to claim 40, wherein the equalizing device of the shoulder strap comprises a connection for tensional transfer between the two shoulder straps in a form of a duct extending through the housing, through which duct a band connecting or uniting the two shoulder straps is displaceable.*

*42. A backpack vacuum cleaner comprising, in combination: a housing enclosing a motor and an impeller to provide the suction effect and with a compartment for a filter bag; a connection branch for a suction hose, with the housing including a wall for facing the bearer; and at least one strap for carrying the housing with the wall being against the bearer, with the wall including projections for providing air circulation between the wall of the housing and the bearer.*

*43. A vacuum cleaner according to claim 42, wherein the strap includes biasing means adapted to allow the pulling out of a predetermined length of the strap under resilient tension.*

*44. A vacuum cleaner according to claim 42, wherein the strap is a hip strap and at its connections to the housing forms an angle (v) with the center plane of the vacuum cleaner of 60°–75°.*

*45. A vacuum cleaner according to claim 42, wherein the projections are hemispherical.*

* * * * *